R. KEESE.
Churn.
No. 63,728.
Patented April 9, 1867.
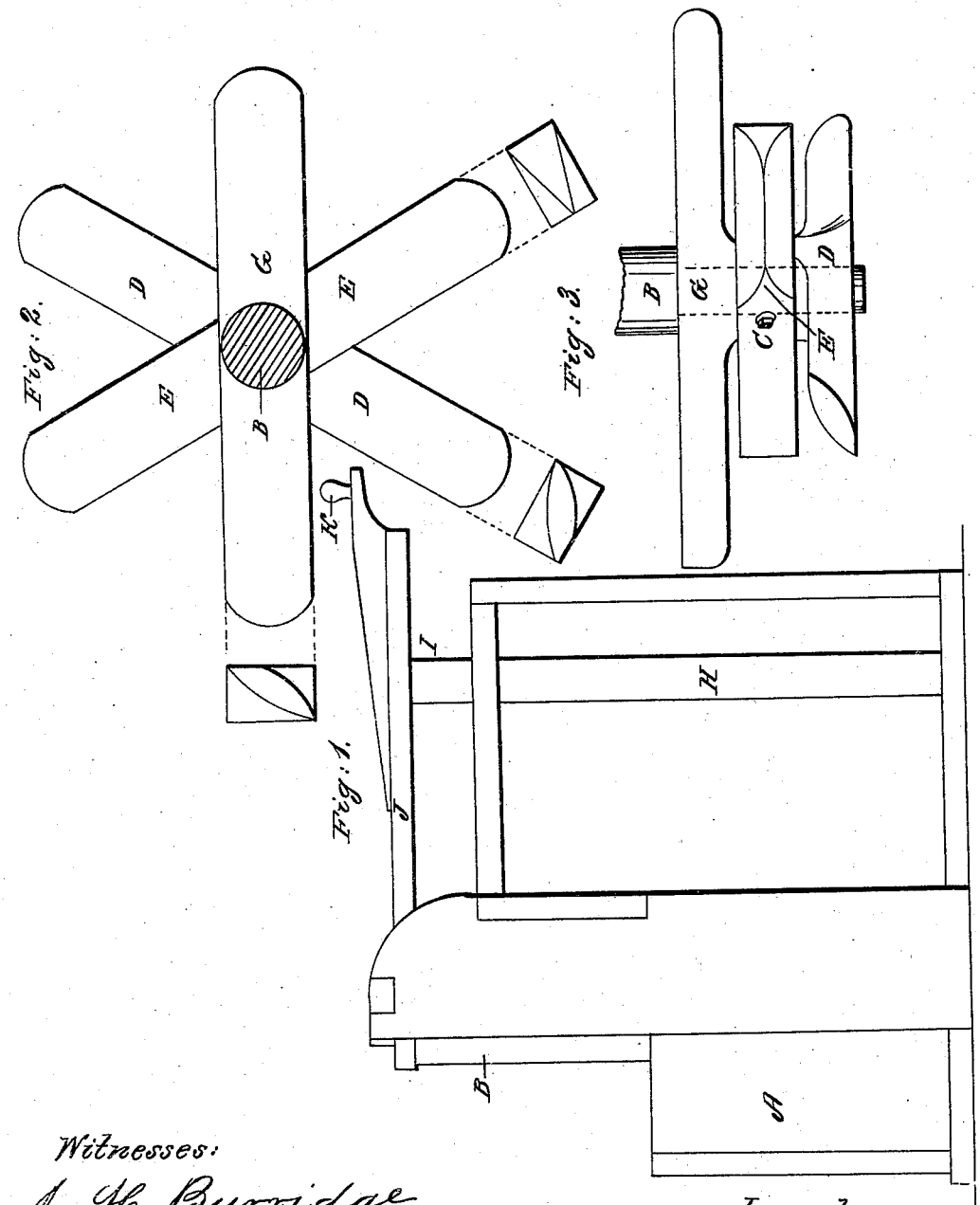
Witnesses:
J. H. Burridge.
Frank Alden.
Inventor:
Rich'd Keese.

United States Patent Office

RICHARD KEESE, OF BENNINGTON, OHIO.

Letters Patent No. 63,728, dated April 9, 1867.

---

IMPROVEMENT IN CHURNS.

---

The Schedule referred to in these Letters Patent and making part of the same.

---

TO ALL WHOM IT MAY CONCERN:

Be it known that I, RICHARD KEESE, of Bennington, in the county of Morrow, and State of Ohio, have invented certain new and useful improvements in Churns; and I do hereby declare that the following is a full and complete description of the construction and operation of the same, reference being had to the accompanying drawings, making a part of this specification, in which—

Figure 1 is a side view of the churn.
Figure 2 is a top view of the dasher.
Figure 3 is a side view of the same.
Like letters of reference refer to like parts in the views.

The body of this churn consists of the square box A, fig. 1, the size of which according to the capacity of the churn required. B is a shaft, the lower end of which is provided with a point, and upon which it revolves in a step at the bottom of the churn. On the lower end of this shaft are arranged three dashers, D E G, fig. 2, but which may be more or less in number for a reason hereafter given. These dashers are made adjustable, and are secured to the shaft by the thumb-screws C, or by inserting a pin through them into the shaft. The relative position of the dashers to each other and the peculiar shape of the same is shown in figs. 2 and 3, in which it will be seen that the lowest one, D, is so biased as to throw the cream up from the bottom of the churn; whereas, the middle one, E, is biased from the two sides down to a longitudinal edge, E, the effect of which is to divide the cream, throwing a part of the same downward against the cream as it is thrown upward by the lower dasher, and the upper side throwing the cream upward against the cream thrown downward by the upper dasher G, the shape of which being the reverse of the dasher D, the inclination of the bias of the lower one throwing the cream upward from the bottom against the lower side of the middle dasher, and the inclination of the bias of the upper dasher throwing the cream down upon the plane of the middle one; hence, by the revolution of the dashers, the cream is agitated and thrown against itself and at the same time compressed by the inclination of the dashers above described. As it passes between them, by this joint action of the dashers, the cream is completely agitated, and with increased force, by the compressing action of the dashers, and thus the globules or sacs are easily and quickly broken and the work of churning soon accomplished. As above remarked, the dashers or beaters are so attached to the shaft as to be adjustable, the purpose of which is to regulate the number of beaters and the distance of the same from each other according to the nature and quantity of cream in the churn. A very thick cream either requires a less number of dashers or that the same number be placed further apart, so that the cream may pass easily and freely between them. A large quantity of cream requires a larger number of dashers in consequence of the increased depth, so that the whole mass may be agitated from top to bottom. This addition to the number of dashers is easily and readily supplied by sliding those upon the shaft further up and then adding the others below and securing them by means of the thumb-screws referred to. Thus, a churn full of cream may be churned at once by simply adding more beaters to the dasher.

The churn is operated as follows: H is a shaft, upon which is mounted the wheel I, from which runs the band J around a pulley on the shaft B, the operation being performed by the handle K, fixed to the upper side of the wheel I, above referred to.

What I claim as my improvement, and desire to secure by Letters Patent, is—

The adjustable dashers D E G, and thumb-screws C, constructed and arranged in relation to each other as specified, and in combination with the shaft and body of the churn, operating as and for the purpose set forth.

RICH'D KEESE.

Witnesses:
GEO. HOWELL,
PHEBE C. HOWELL.